(12) United States Patent  (10) Patent No.: US 9,076,253 B2
Saunders  (45) Date of Patent: *Jul. 7, 2015

(54) METHODS AND DEVICES FOR DISPLAYING AN OVERLAY ON A DEVICE DISPLAY SCREEN

(71) Applicant: BLACKBERRY LIMITED, Waterloo (CA)

(72) Inventor: Christopher O'Byrne Saunders, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 146 days.

This patent is subject to a terminal disclaimer.

(21) Appl. No.: 13/775,346

(22) Filed: Feb. 25, 2013

(65) Prior Publication Data

US 2013/0169686 A1    Jul. 4, 2013

Related U.S. Application Data

(63) Continuation of application No. 12/560,506, filed on Sep. 16, 2009, now Pat. No. 8,416,262.

(51) Int. Cl.
*G09G 5/00*  (2006.01)
*G06T 11/00* (2006.01)
*G09G 5/02*  (2006.01)
*H04M 1/725* (2006.01)

(52) U.S. Cl.
CPC .............. *G06T 11/001* (2013.01); *G09G 5/00* (2013.01); *G09G 5/02* (2013.01); *G09G 2320/066* (2013.01); *G09G 2340/10* (2013.01); *G09G 2340/14* (2013.01); *G09G 2360/16* (2013.01); *H04M 1/72569* (2013.01)

(58) Field of Classification Search
USPC .......................................... 345/629, 589, 600
See application file for complete search history.

(56) References Cited

U.S. PATENT DOCUMENTS

| 4,988,852 A |   | 1/1991 | Krishnan |
|---|---|---|---|
| 5,283,560 A |   | 2/1994 | Bartlett |
| 5,304,787 A |   | 4/1994 | Wang |
| 5,638,501 A |   | 6/1997 | Gough et al. |
| 5,939,699 A |   | 8/1999 | Perttunen et al. |
| 6,037,936 A | * | 3/2000 | Ellenby et al. ................ 715/764 |

(Continued)

FOREIGN PATENT DOCUMENTS

| CA | 2714221 | 3/2011 |
|---|---|---|
| CN | 1886736 | 12/2006 |

(Continued)

OTHER PUBLICATIONS

Response. European Patent Application No. 09170416.3. Dated: Nov. 29, 2013.

(Continued)

*Primary Examiner* — M Good Johnson
(74) *Attorney, Agent, or Firm* — Perry + Currier Inc.

(57) ABSTRACT

Disclosed herein is a camera unit configured to capture an image, and a microprocessor configured to control a display to display the image and an overlay substantially simultaneously. In one broad aspect, at least one of the level of transparency, the brightness level, or the color value of the overlay is determined based on at least one of a representative brightness level or a representative color value associated with the image being displayed.

29 Claims, 16 Drawing Sheets

(56) References Cited

U.S. PATENT DOCUMENTS

| | | | |
|---|---|---|---|
| 6,037,937 | A | 3/2000 | Beaton et al. |
| 6,088,018 | A | 7/2000 | DeLeeuw et al. |
| 6,317,128 | B1 | 11/2001 | Harrison et al. |
| 6,353,450 | B1 | 3/2002 | DeLeeuw |
| 6,565,003 | B1 | 5/2003 | Ma |
| 6,590,583 | B2 | 7/2003 | Soohoo |
| 6,694,486 | B2 | 2/2004 | Frank et al. |
| 6,741,266 | B1 | 5/2004 | Kamiwada et al. |
| 6,829,015 | B2 | 12/2004 | Kwon |
| 6,877,661 | B2 | 4/2005 | Webb et al. |
| 6,954,905 | B2 | 10/2005 | Brown et al. |
| 7,046,254 | B2 | 5/2006 | Brown et al. |
| 7,230,584 | B2 | 6/2007 | Elliott |
| 7,348,999 | B1 | 3/2008 | Spitz |
| 7,353,996 | B2 | 4/2008 | Goodman et al. |
| 7,392,951 | B2 | 7/2008 | Ray et al. |
| 7,477,777 | B2 | 1/2009 | Wells |
| 7,479,967 | B2 * | 1/2009 | Bachelder et al. ............ 345/592 |
| 7,673,250 | B2 | 3/2010 | Taylor |
| 7,702,673 | B2 * | 4/2010 | Hull et al. ................. 707/707 |
| 8,040,361 | B2 | 10/2011 | Bacheider et al. |
| 8,144,251 | B2 | 3/2012 | Huston et al. |
| 8,416,262 | B2 | 4/2013 | Saunders |
| 2002/0039095 | A1 | 4/2002 | Nakano |
| 2004/0095358 | A1 | 5/2004 | Takagi et al. |
| 2005/0253877 | A1 * | 11/2005 | Thompson ................... 345/698 |
| 2005/0264668 | A1 | 12/2005 | Miyamoto |
| 2005/0278648 | A1 | 12/2005 | Taylor |
| 2006/0197727 | A1 | 9/2006 | Malzbender |
| 2006/0243806 | A1 | 11/2006 | Goodman et al. |
| 2007/0035542 | A1 | 2/2007 | Mowry |
| 2007/0046687 | A1 * | 3/2007 | Soroushi et al. ............. 345/589 |
| 2008/0032670 | A1 | 2/2008 | Wada et al. |
| 2008/0105749 | A1 * | 5/2008 | Lei .......................... 235/462.42 |
| 2009/0088203 | A1 | 4/2009 | Havens et al. |
| 2009/0090782 | A1 | 4/2009 | May |
| 2010/0188548 | A1 * | 7/2010 | Robinson et al. ........ 348/333.01 |

FOREIGN PATENT DOCUMENTS

| | | |
|---|---|---|
| CN | 1933541 | 3/2007 |
| CN | 101529497 | 9/2009 |
| CN | 102025829 | 4/2011 |
| EP | 1182639 | 2/2002 |
| EP | 1764742 | 3/2007 |
| EP | 2299693 | 3/2011 |
| WO | 2008054620 | 5/2008 |

OTHER PUBLICATIONS

Exam Report. European Patent Application No. 09170416.3. Dated: Jul. 31, 2013.
Office Action. Canadian Patent Application No. 2,714,221. Dated: Jul. 30, 2013.
Rejection Decision. Chinese Patent Application No. 201010289861. 8. Dated: Jul. 10, 2013.
Rejection Decision (English Translation). Chinese Patent Application No. 201010289861.8. Dated: Jul. 10, 2013.
Prosecution Documents for U.S. Appl. No. 12/560,506, issued to U.S. Patent No. 8,416,262 on Apr. 9, 2013.
Canadian Office Action for Canadian Patent Application No. 2,714,221, dated Dec. 13, 2012.
Chinese Office Action (English translation) for Chinese Patent Application No. 201010289861.8, dated Oct. 24, 2012.
European Response for European Patent Application No. 09170416. 3, dated Apr. 7, 2010.
Extended European Search Report for European Patent Application No. 09170416.3, dated Feb. 9, 2010.
Brown, Margaret, "Live Viewing", Jul. 2008, Retrieved from the Internet: http://www.photoreview.com.au/guides/digitalsir/live-viewing.aspx.
IxMat, "The Mobile Phone as Mobile Scanner", Retrieved from the Internet, Jul. 8, 2009: http://www.iexcellence.com/index.php?option=com_content&view=article&id=141&Itemid=225&lang=en.
Screenshots retrieved from IxMat Scanner application on Jun. 26, 2009.
Chinese Office Action for Chinese Patent Application No. 201010289861.8, dated Mar. 29, 2013.
Chinese Office Action (English Translation) for Chinese Patent Application No. 201010289861.8, dated Mar. 29, 2013.
Notice of Allowance. Canadian Patent Application No. 2,714,221. Dated: May 14, 2014.

* cited by examiner

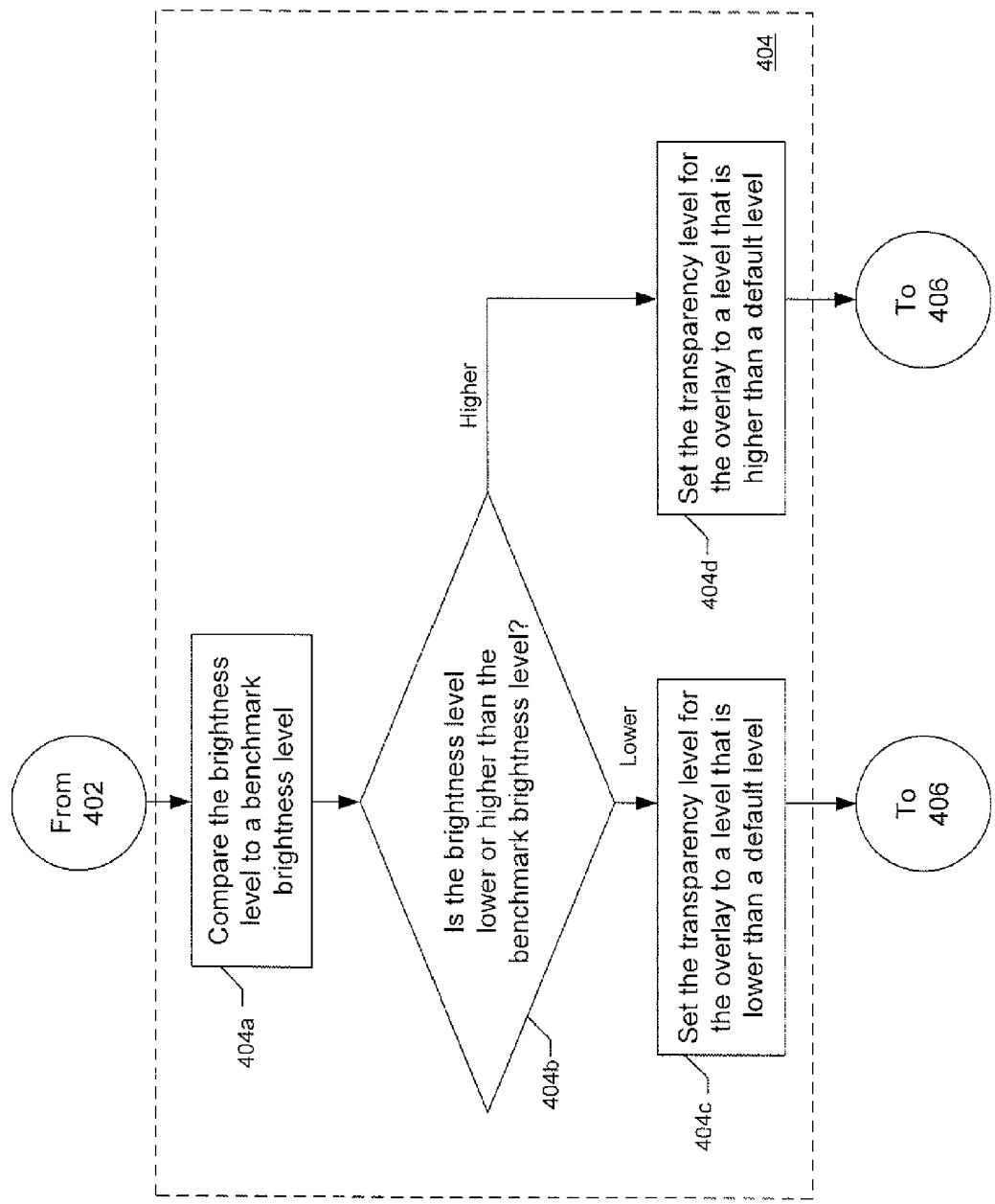

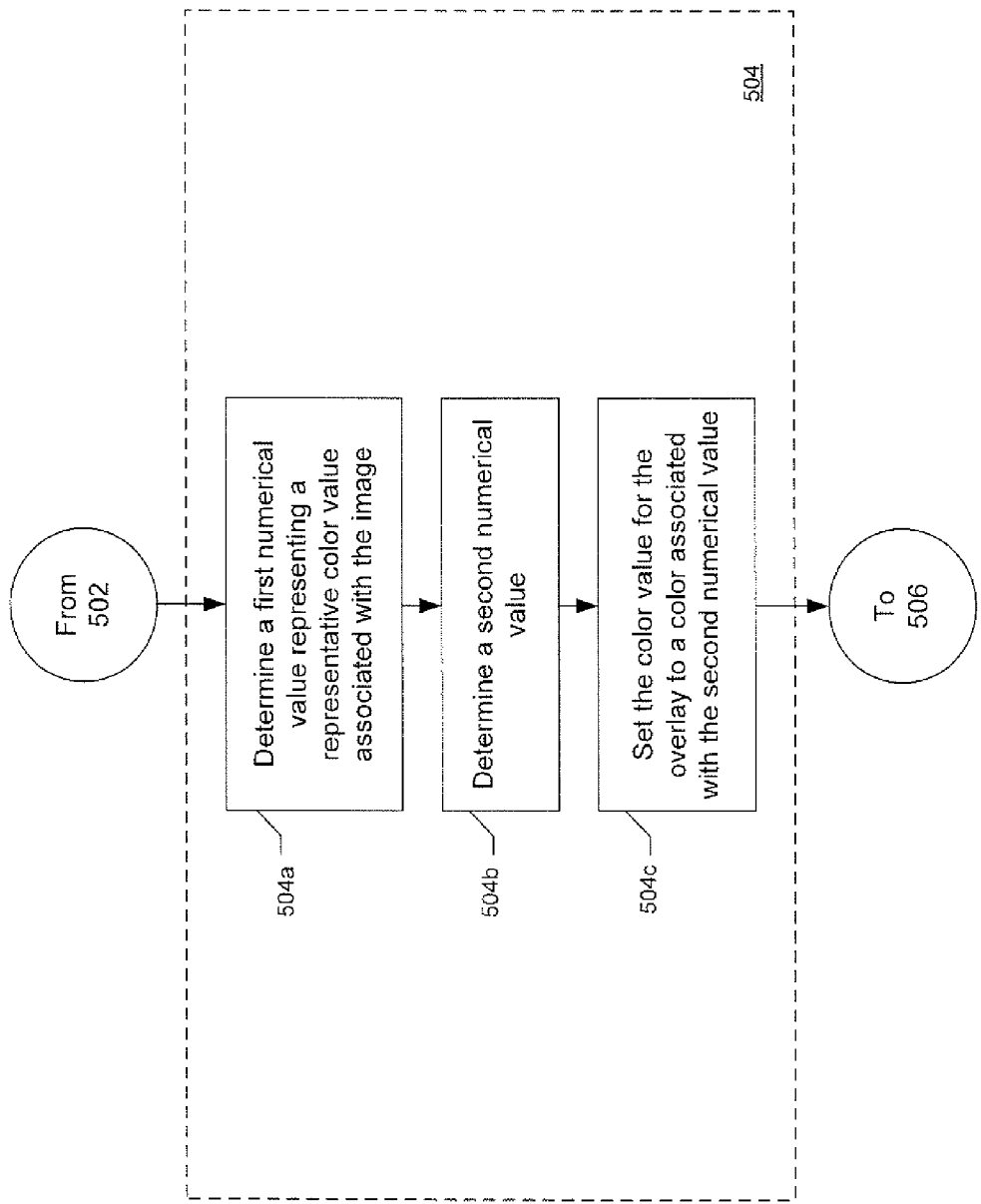

METHODS AND DEVICES FOR DISPLAYING AN OVERLAY ON A DEVICE DISPLAY SCREEN

CROSS-REFERENCE TO RELATED APPLICATION

This application is a continuation of U.S. patent application Ser. No. 12/560,506, filed Sep. 16, 2009. The entire contents of U.S. patent application Ser. No. 12/560,506 are hereby incorporated by reference.

FIELD

Embodiments described herein relate generally to devices—such as devices that may be placed and used in the human hand—and methods associated with displaying an overlay with an image, on a display screen associated with the devices.

BACKGROUND

A camera may capture an image for display on a display screen. This may allow the user to consider the image before the user "takes" the picture, whereby the user directs that the camera save the image being displayed into a memory, for example. Some devices, such as mobile devices, may be equipped with camera units.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIGS. 10A and 10B are flowcharts illustrating methods of displaying an overlay in a device display screen, in accordance with at least one embodiment;

FIGS. 11A and 11B are flowcharts illustrating methods of displaying an overlay in a device display screen, in accordance with at least one other embodiment.

DETAILED DESCRIPTION

Figure 1:
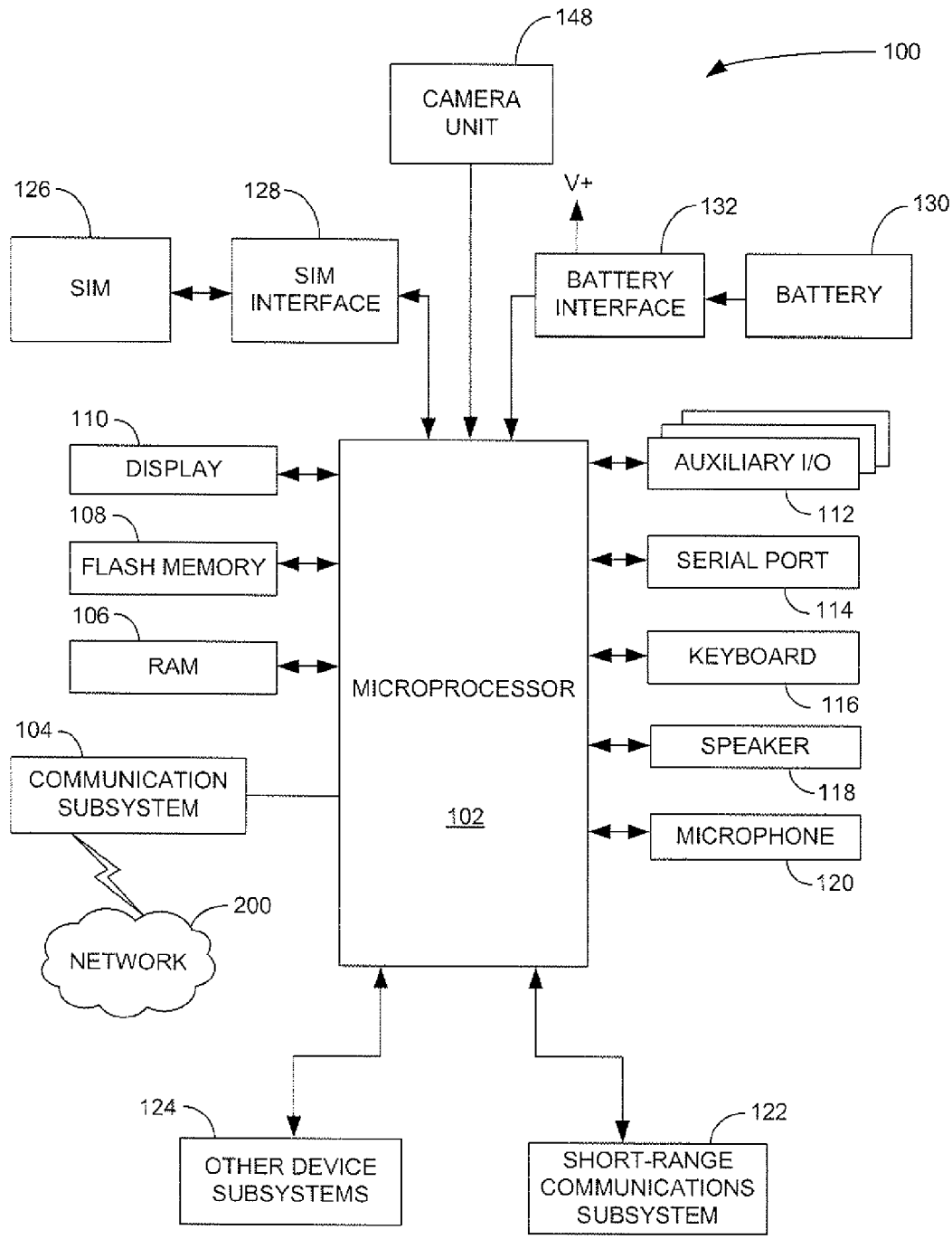
FIG. 1 is a block diagram of a mobile device in one example implementation.

In one broad aspect, there is provided a device comprising: a camera unit configured to capture an image; a display configured to display an overlay and the image; and a microprocessor configured to perform acts comprising: processing the image to determine at least one of a brightness level or a color value associated with the image, determining at least one of a transparency level, a brightness level, or a color value for the overlay, as a function of the at least one of the brightness level or the color value associated with the image, generating the overlay for display at the determined at least one of the transparency level, the brightness level, or the color value for the overlay, and controlling the display to display the overlay and the image substantially simultaneously.

In one embodiment, the overlay is at least partially transparent.

In another embodiment, the image comprises an object, wherein the overlay resembles at least a portion of the object.

In another embodiment, the object comprises a barcode, and wherein the overlay comprises a barcode alignment reference.

In another embodiment, the overlay comprises a menu.

In another embodiment, the overlay comprises a dialog box.

In another embodiment, the overlay is selected from a plurality of pre-stored overlays.

In another embodiment, the microprocessor is configured to repeat said acts when the image changes to a new image, without user intervention.

In another embodiment, the device comprises a mobile device.

In another embodiment, the brightness level associated with the image is an average brightness level associated with the image.

In another embodiment, determining the transparency level for the overlay comprises: comparing the brightness level associated with the image to a benchmark brightness level; if the brightness level associated with the image is lower than the benchmark brightness level, then setting the transparency level for the overlay to a level that is lower than a default transparency level; and if the brightness level associated with the image is higher than the benchmark brightness level, then setting the transparency level for the overlay to a level that is higher than the default transparency level.

In another embodiment, determining the brightness level for the overlay comprises: comparing the brightness level associated with the image to a benchmark brightness level; if the brightness level associated with the image is lower than the benchmark brightness level, then setting the brightness level for the overlay to a level that is lower than a default brightness level; and if the brightness level associated with the image is higher than the benchmark brightness level, then setting the brightness level for the overlay to a level that is higher than the default brightness level.

In another embodiment, the color value associated with the image is an average hue associated with at least a part of the image.

In another embodiment, determining the color value for the overlay comprises: determining at least one first numerical value, wherein the at least one first numerical value identifies a first location on a color wheel that represents the color value associated with the image; determining at least one second numerical value, such that the at least one second numerical value identifies a second location substantially opposite to the first location on the color wheel; and setting the color value for the overlay to a color associated with the at least one second numerical value.

In another embodiment, determining the color value for the overlay comprises: determining at least one first numerical value, wherein the at least one first numerical value represents the color value associated with the image; determining at least one second numerical value, each second numerical value being computed as a function of a corresponding one of the at least one first numerical value; and setting the color value for the overlay to a color associated with the at least one second numerical value.

In another broad aspect, there is provided a method of displaying an overlay and an image, comprising: identifying an image to be displayed; processing the image to determine at least one of a brightness level or a color value associated with the image; determining at least one of a transparency level, a brightness level, or a color value for the overlay as a function of the at least one of the brightness level or the color value associated with the image; generating the overlay for display at the determined at least one of the transparency level, the brightness level, or the color value for the overlay; and displaying the overlay and the image substantially simultaneously.

In another broad aspect, there is provided a physical computer-readable storage medium on which a plurality of instructions executable by a processor of a device is stored, the instructions for performing the acts of a method of displaying an overlay and an image, comprising: identifying an image to be displayed; processing the image to determine at least one of a brightness level or a color value associated with the image; determining at least one of a transparency level, a brightness level, or a color value for the overlay as a function of the at least one of the brightness level or the color value associated with the image; generating the overlay for display at the determined at least one of the transparency level, the brightness level, or the color value for the overlay; and displaying the overlay and the image substantially simultaneously.

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. In some embodiments the mobile device may comprise a portable electronic device having no wireless communication capability, such as a digital camera. A mobile device may communicate with other devices through a network of transceiver stations.

Figure 2:
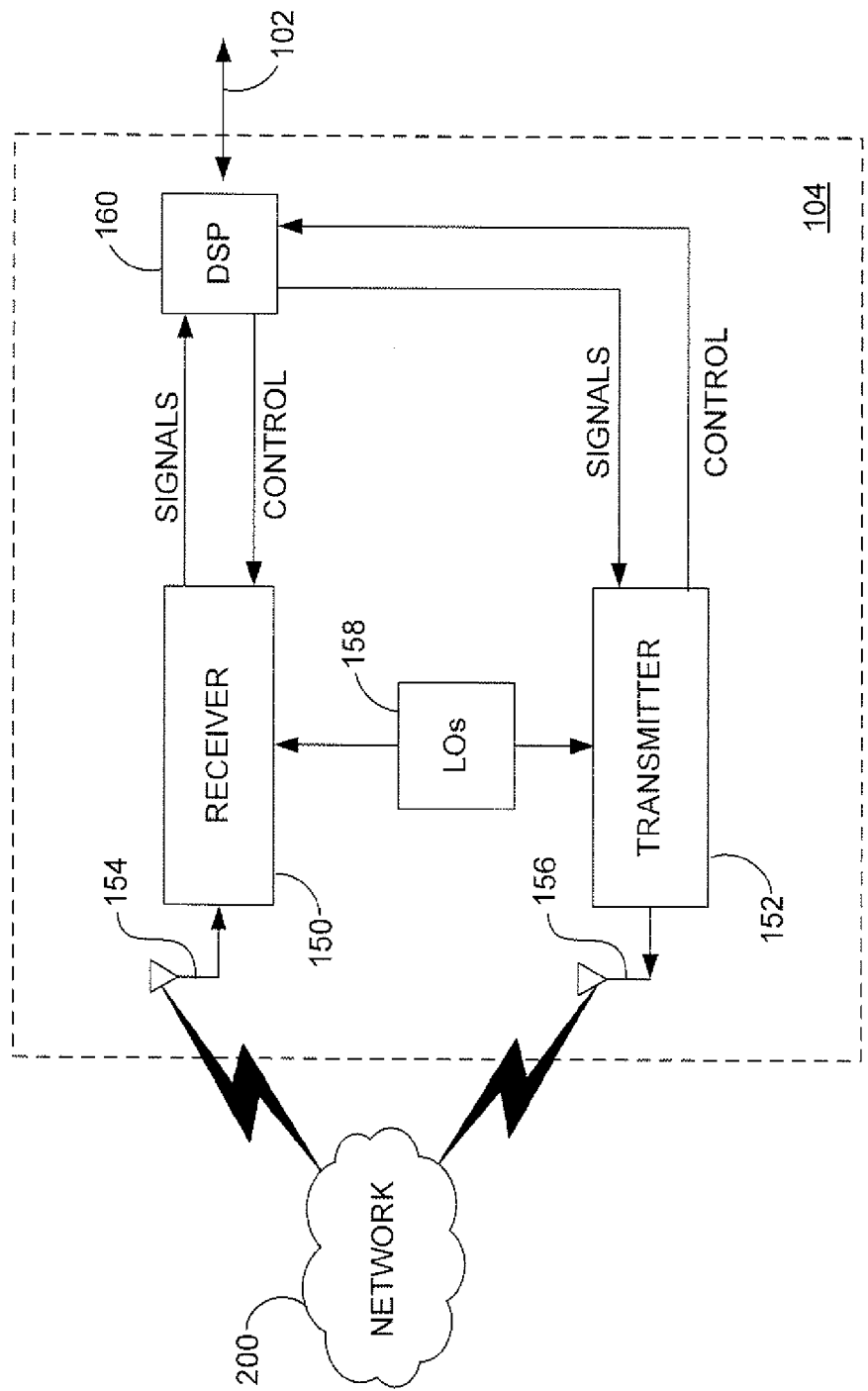
FIG. 2 is a block diagram of a communication subsystem component of the mobile device of FIG. 1.
Figure 3:
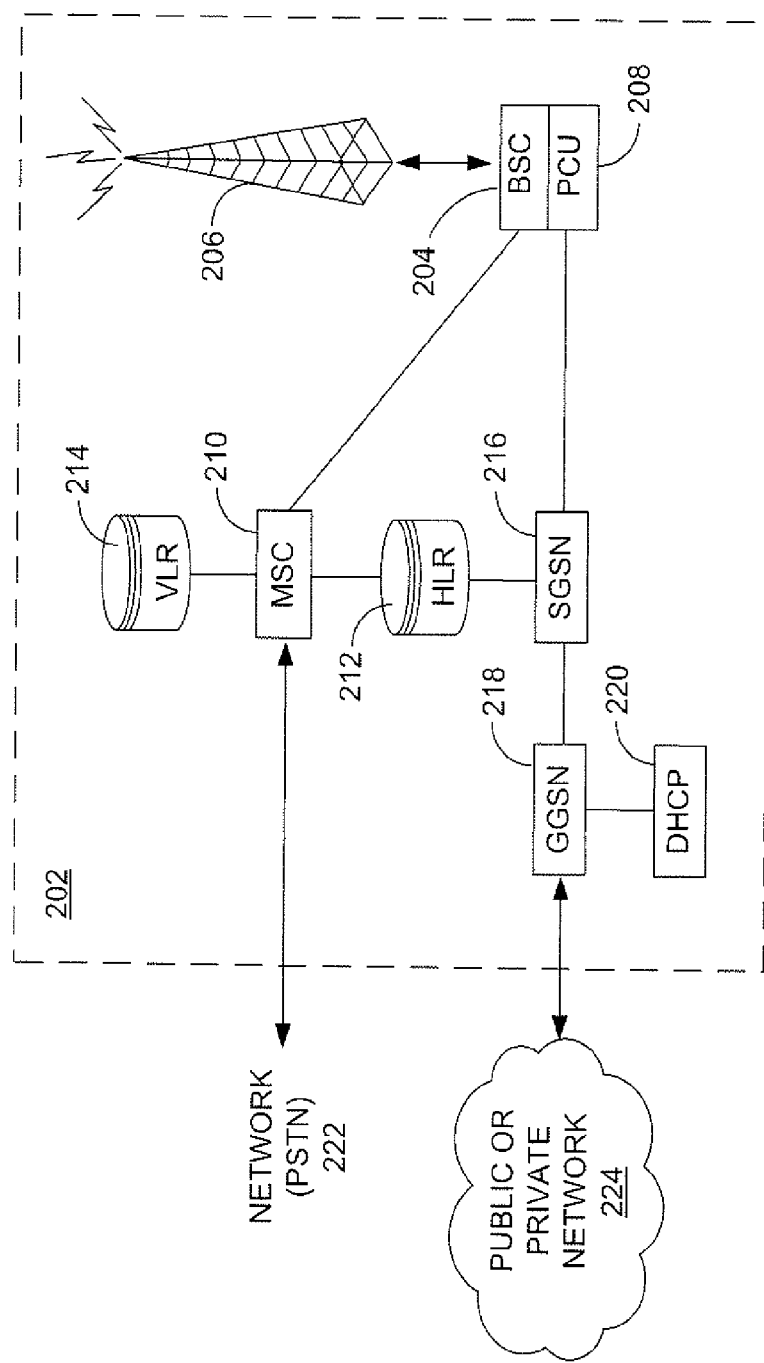
FIG. 3 is a block diagram of a node of a wireless network.

To aid the reader in understanding the structure of a typical mobile device and how it communicates with other devices, reference is made to FIGS. 1 through 3. The concepts recited in the claims are not necessarily limited to the typical mobile device described below, however.

Referring first to FIG. 1, a block diagram of a mobile device in one example implementation is shown generally as 100. Mobile device 100 comprises a number of components, the controlling component being microprocessor 102 (which may be, but need not be, the principal processor in mobile device 100). Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148 (also referred to more generally herein as a camera), short-range communications subsystem 122 and other device subsystems 124.

As will be discussed in more detail below, microprocessor 102 may interact with display 110 and camera unit 148 to facilitate the display of an overlay and an image. Camera unit 148 may be any kind of camera unit, including but not limited to any device configured to capture moving or still images. Camera unit 148 may include a dedicated camera activator, such as a key on keyboard 116 or a dedicated camera button (not shown in FIG. 1) that can be employed by a user to trigger the camera unit 148 to save the image being displayed to a memory or other storage. Display 110 can be any kind of apparatus configured to display visual information, including but not limited to a light-emitting diode (LED) display and a touch screen display. In a typical implementation, the display 110 serves as a viewfinder for camera unit 148, effectively showing the user the image that the camera unit 148 "sees," dynamically changing as what is "seen" by the camera unit 148 changes. In other typical implementations, the display 110 serves as an apparatus for displaying a still image captured by the camera unit 148. In still further implementations, the display 110 can serve both functions.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list.

Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

As indicated above, the mobile device and wireless network are illustrative and the concepts described herein are not necessarily restricted to such mobile devices or networks. In some embodiments, the concepts may be implemented in a mobile device such as a digital camera, which may or may not have wireless communication capability. In general, the concepts may be implemented by any number of machines capable of displaying an image.

A graphic may be displayed at the same time that an image within a camera unit's field of view is being displayed on the display screen to, for example, facilitate positioning of specific objects seen by a user in the image being displayed in the display screen at a given time. This graphic is generally referred to herein as an "overlay".

In at least one embodiment, an overlay may be at least partially transparent (e.g. semi-transparent), and comprise elements that appear to be displayed atop an image within the field of view of a camera as shown in the display screen. Transparency of the overlay may enable a user to see both the overlay and the image on the display screen at the same time. However, in variant embodiments, the overlay may be opaque or may appear to be beneath the image being displayed, for example.

In certain applications, an overlay may be used as a guide to ensure that certain objects in the image within the field of view of the camera are centered within the display screen, for example. In other applications, an overlay may be used to display information or to receive user input or both. For example, the overlay may comprise a menu or a dialog box.

An illustrative mobile device 100*a* is shown in FIGS. 4 to 8. The user has pointed a camera (not shown in FIGS. 4 to 8) of mobile device 100*a* at an object (a barcode shown in the display of a second mobile device 100*b*, in these examples). In these examples, an overlay 310 resembling a barcode is substantially simultaneously displayed with the image 300 within the field of view of the camera on the display 110*a*. These figures are provided for illustration purposes only, and applications of embodiments described herein shall not be limited to the displaying of barcodes (whether on a second mobile device or otherwise) or overlays resembling barcodes. Embodiments described herein may be applicable to any type of overlay, displayed substantially simultaneously with images comprising any type of object.

Showing the overlay 310 and the image 300 "substantially simultaneously" includes showing the overlay 310 and the image 300 at the same time on the display 110. Showing the overlay 310 and the image 300 "substantially simultaneously" also includes showing the overlay 310 and the image 300 in a manner that seems close in time to the user, such that the user can perceive the overlay 310 and the image 300 in relation to one another. In variations of some embodiments, the microprocessor may display the overlay 310 and the image 300 alternately or in rapid succession, which the user can perceive as being substantially simultaneous.

Figure 4:
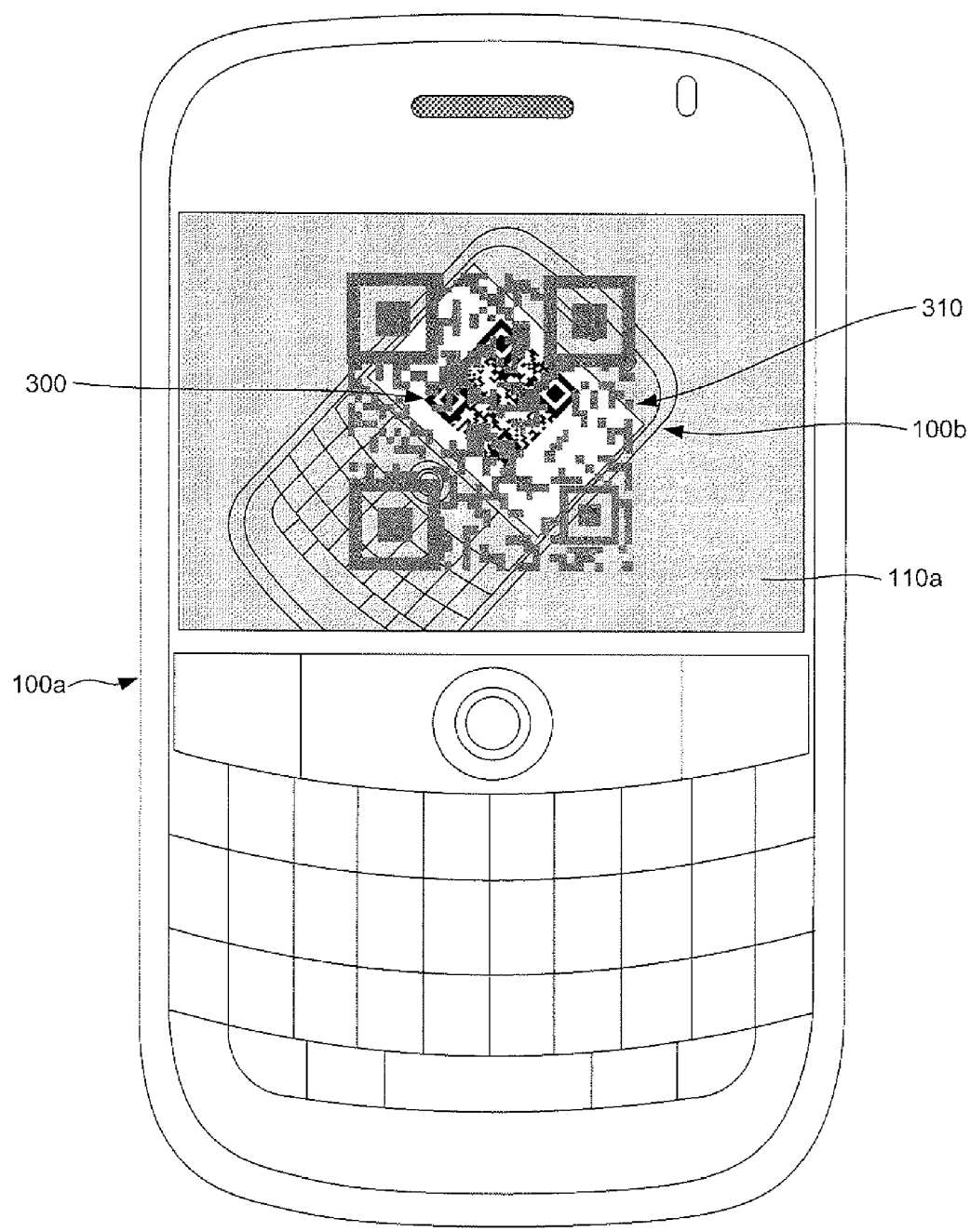
FIGS. 4 to 9 are plan views of an illustrative mobile device with an example screen, in which an image and an overlay are being displayed in accordance with at least one embodiment.

It has been observed that when the brightness of the image being displayed in the display 110 changes, the overlay 310 being displayed may become more difficult for a user to see. For example, when mobile devices 100*a* and 100*b* are moved to a darker environment, the overlay 310 as shown in FIG. 4 may become harder for a user to make out on the display 110*a* of mobile device 100*a*. As a further example, when mobile devices 100*a* and 100*b* are moved to a brighter environment, the overlay 310 as shown in FIG. 4 may also become harder for a user to make out on the display 110*a* of mobile device 100*a*.

More generally, it has been observed that the same overlay might not be easily viewed under different conditions, because the brightness or chromatic contrast between an image within the field of view of the camera and the overlay might not be sufficient under a particular set of conditions, for example. This may be particularly problematic when the light conditions under which the camera is operating are subject to change.

In accordance with at least one embodiment described herein, the overlay may be displayed at different levels of transparencies based on certain aspects of the image within the field of view of the camera. For example, the microprocessor of a mobile device may be configured to determine a level of brightness for the image being displayed, and to subsequently determine a corresponding level of transparency for the overlay based on the determined level of brightness. The overlay is then displayed at the determined level of transparency.

Figure 5:
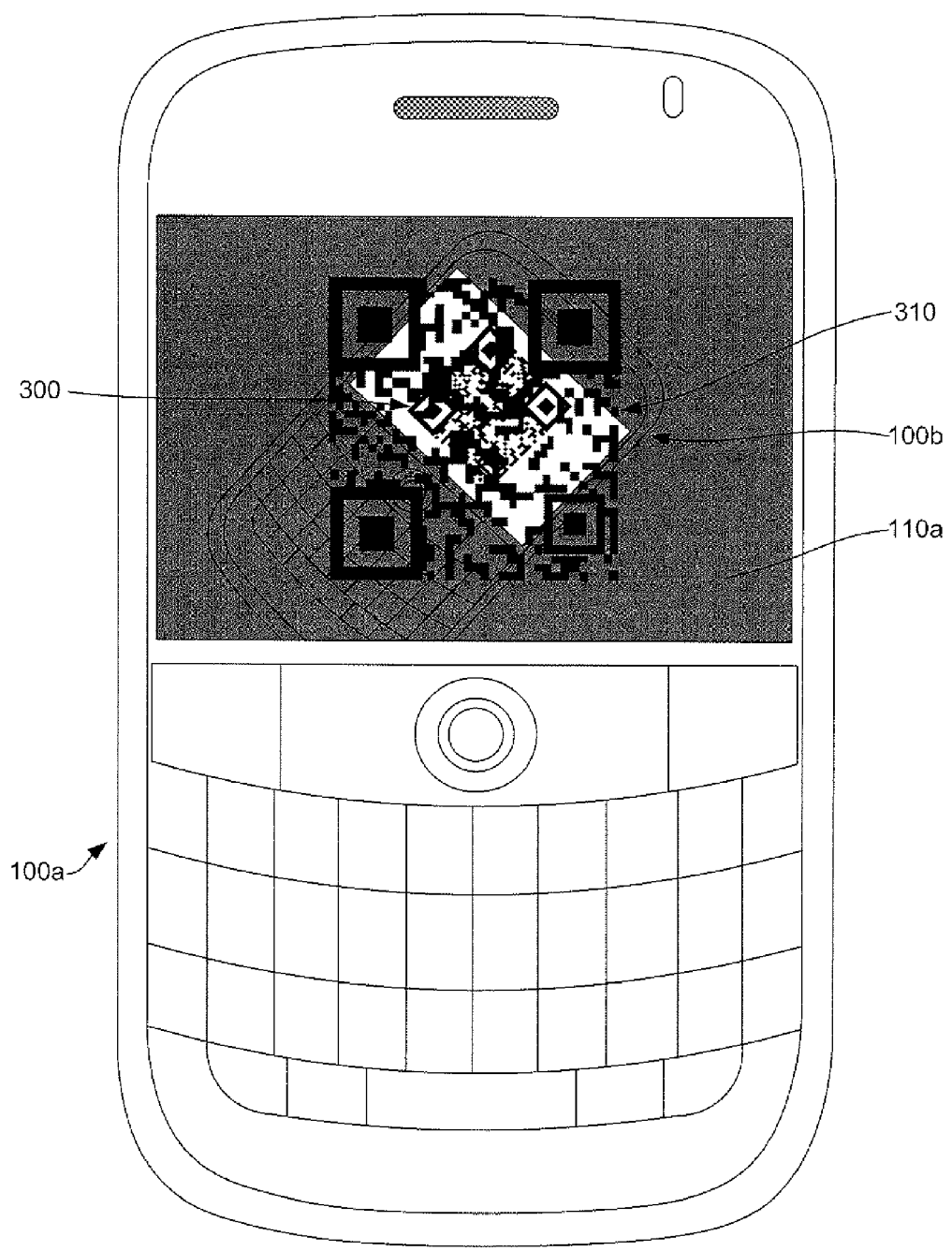
Figure 6:
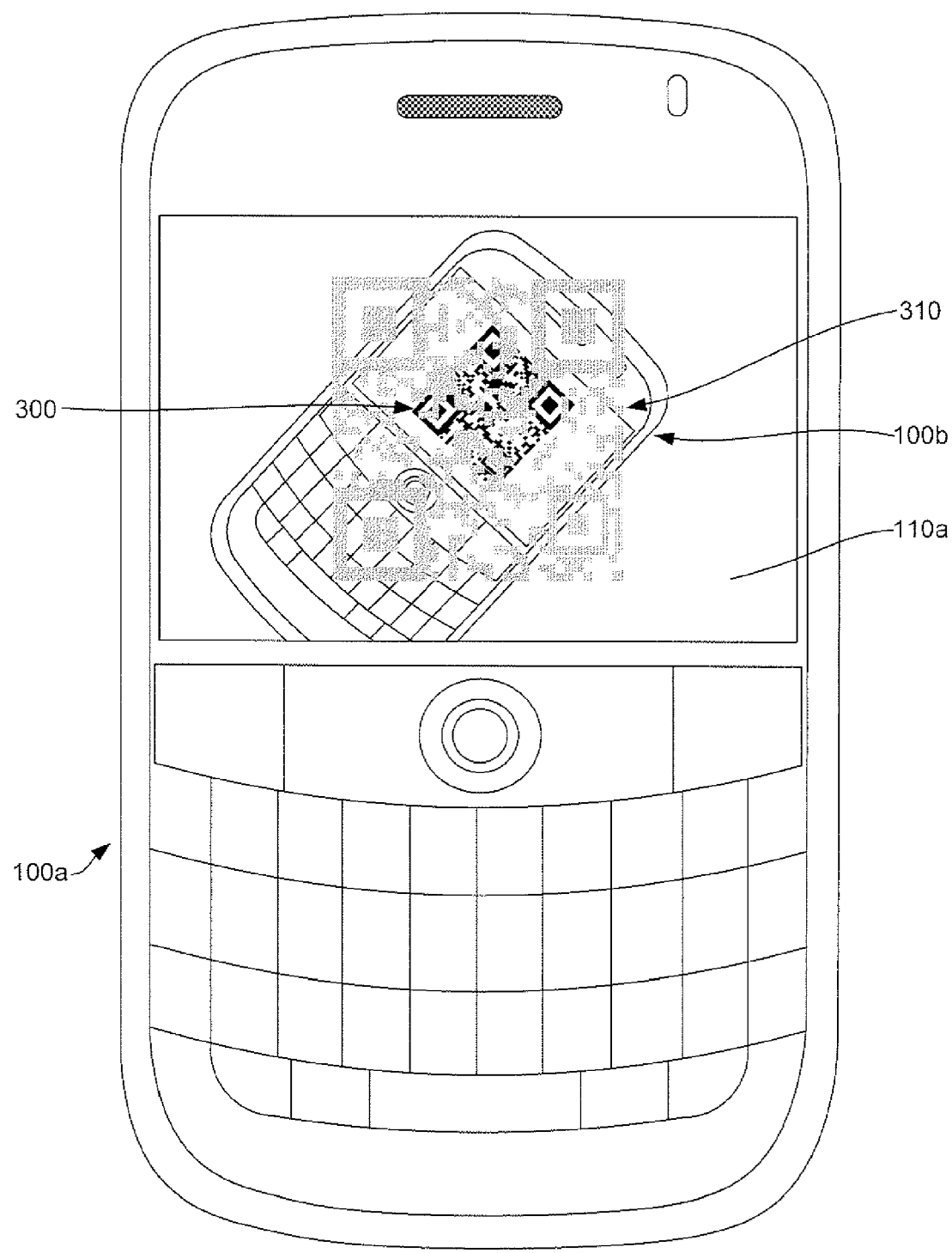

By way of illustration, consider, for example, the screens illustrated in FIGS. 5 and 6. In accordance with at least one embodiment described herein, if the image being displayed to the user on display 110*a* appears very dark, as shown in FIG. 5 (e.g. there is not enough ambient light), the overlay may be made less transparent (i.e. the level of transparency of the overlay is decreased) so that the overlay can be better viewed against a dark background. On the other hand, in accordance with at least one embodiment described herein, if the image being displayed to the user on display 110*a* appears very light, as shown in FIG. 6 (e.g. there is too much ambient light), the overlay may be made more transparent (i.e. the level of transparency of the overlay is increased) so that more details of an object within the image (e.g. a barcode in this example) can be seen despite the presence of the overlay. A default level of transparency for the overlay may be defined, for use under standard or average conditions of brightness, as shown in FIG. 4. Different brightness ranges may be defined to allow the microprocessor to determine what conditions constitute average conditions, darker-than-average conditions, and lighter-than-average conditions, for example.

In accordance with at least one other embodiment described herein, the overlay may be displayed in different colors, based on certain aspects of the image within the field of view of the camera. For example, the microprocessor of a mobile device may be configured to determine a color (or "hue") associated with the image being displayed, and to subsequently determine a corresponding color for the overlay based on the determined color associated with the image. The overlay is then displayed at the determined color for the overlay.

Figure 7:
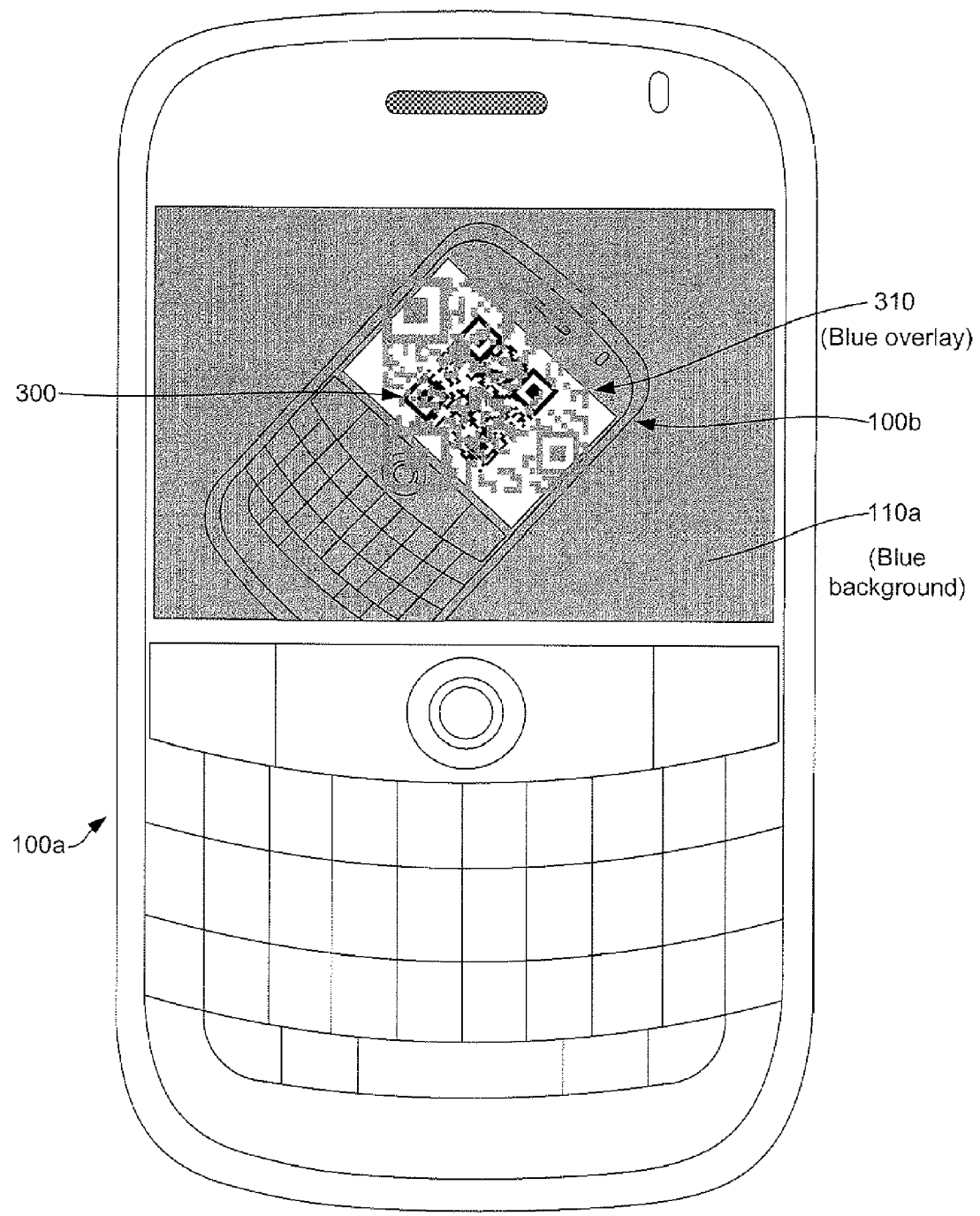

By way of illustration, in the example of FIG. 7, the image being displayed in display 110*a* is primarily of a blue color (e.g. mobile device 100*a* and 100*b* may be in a room illuminated with blue light). The color of the overlay 310 in FIG. 7 is also, coincidentally, displayed in a shade of blue (e.g. where the default color for the overlay 310 is blue). Since the color of the overlay 310 is very similar relative to the image displayed in display 110*a*, the overlay 310 may be difficult for the user to see.

In general, it has been observed that in certain situations, the overlay 310 might not be easily viewed under different conditions, because the chromatic contrast between a captured image and the overlay might not be sufficient under a particular set of conditions, for example. This may be particularly problematic when the color of the background light in which the camera is operating is subject to change.

Figure 8:
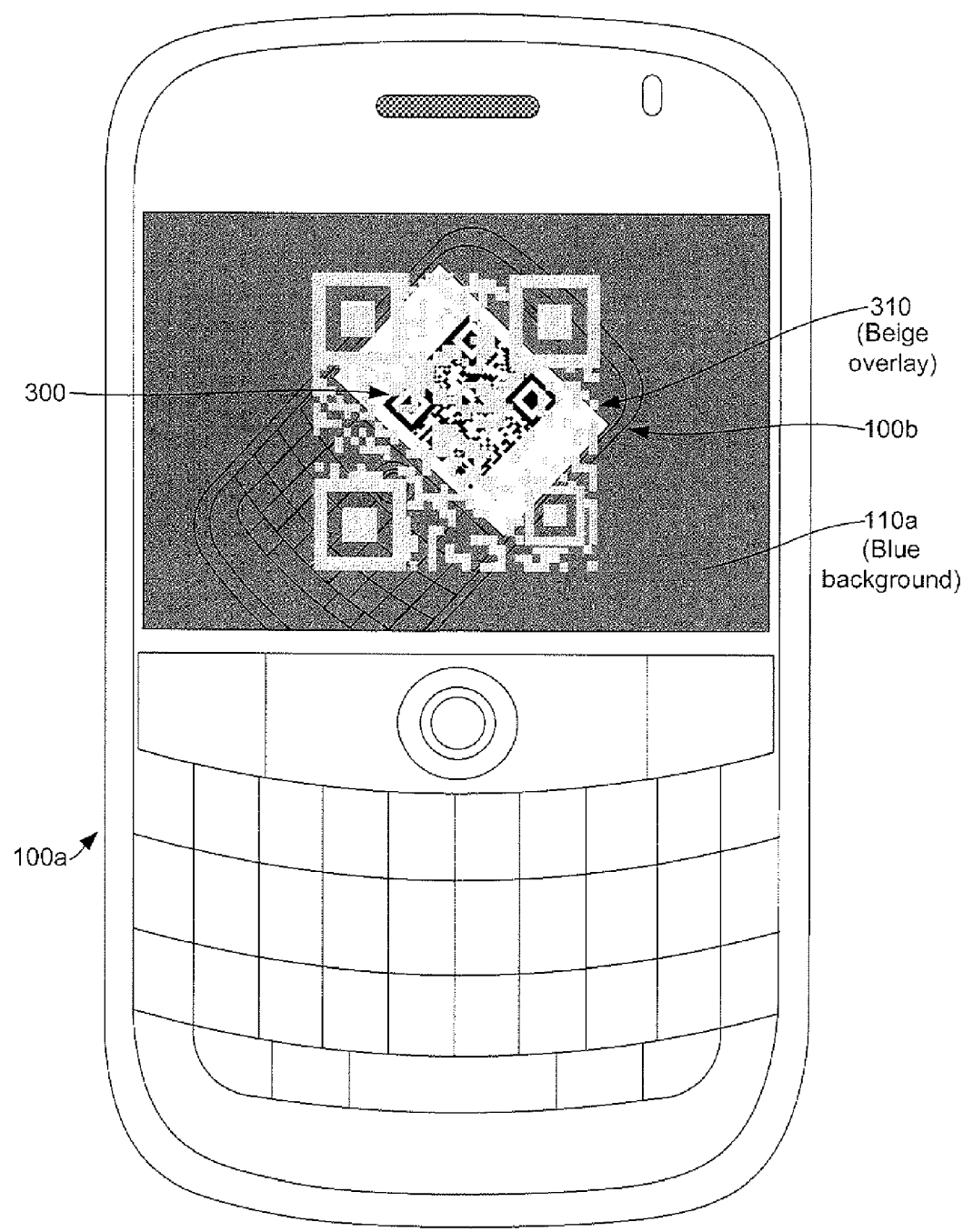

In FIG. 8, in accordance with at least one embodiment described herein, the color of the overlay 310 is set to a selected color (e.g. a shade of beige, chosen by selecting a color value on the opposite side of a color wheel from a blue color value identified from the image displayed in display 110a) that increases the contrast of the overlay 310 relative to, for example, the overall representative background color value of the image being displayed so that the overlay 310 appears more prominent. The representative color value of the image displayed in display 110a may be determined by evaluating the tonal qualities of the image's color histogram, and averaging the individual color values to determine the overall representative hue of the image. In a variant embodiment, the representative color value may be derived from histogram values of only the portion of the image that is partially obscured by the overlay (e.g. the edges of the image may be of a different color value if the user is trying to center an object within the overlay where the target object is against a uniform background).

Figure 9:
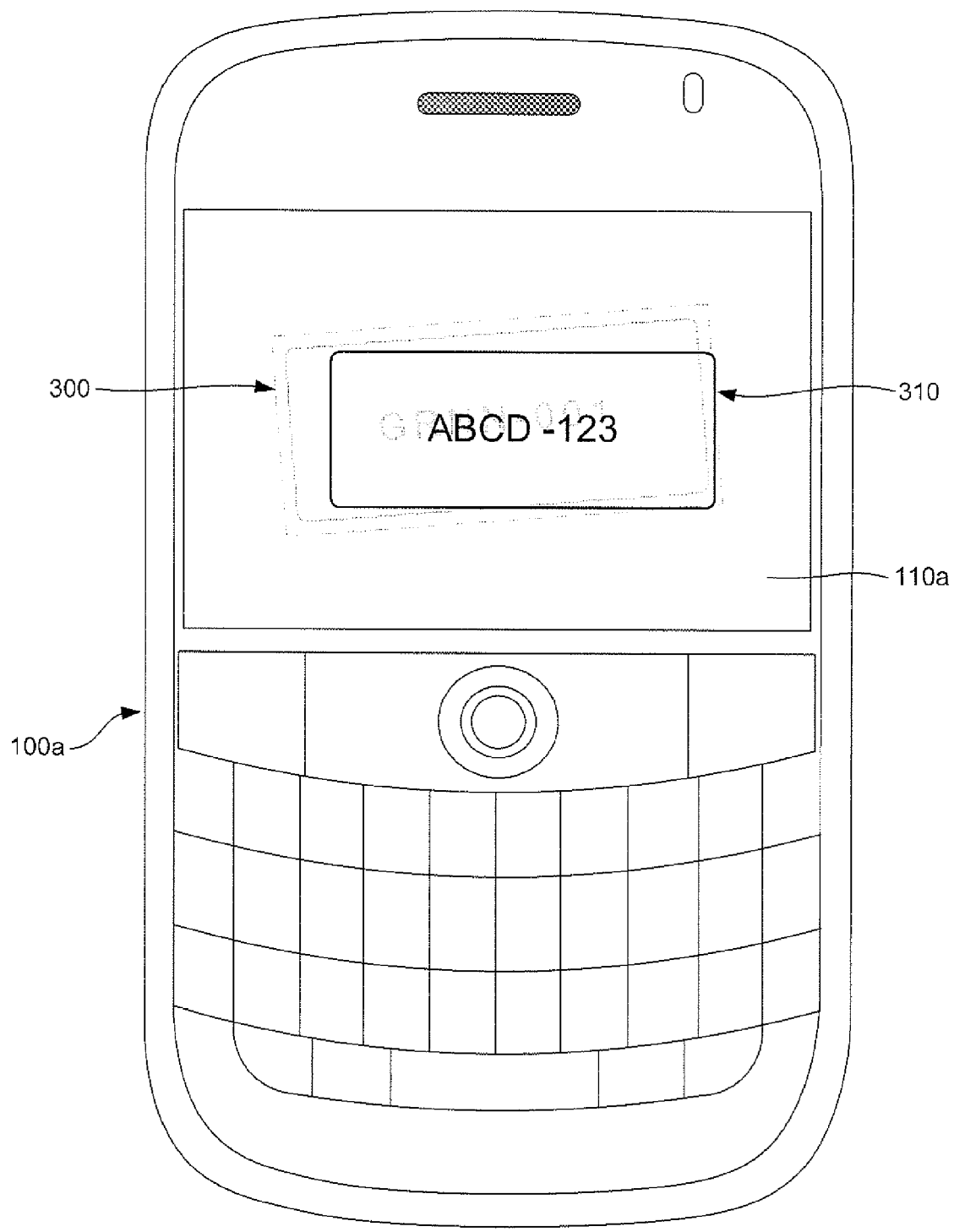

In the examples shown in FIGS. 4 to 8 provided above, the image 300 shown in display 110a comprises a barcode, and overlay 310 also resembles a barcode. However, the embodiments described herein are not limited to applications involving barcodes. For example, in FIG. 9, the image 300 shown in display 110a comprises a license plate, and overlay 310 also resembles a license plate. Other types of objects may be accommodated in variant embodiments. For example, an overlay resembling the shape of a human figure, possibly in a specified pose, may be employed to assist in the taking of pictures of people. As a further example, an overlay resembling a horizon may be employed to assist in the taking of pictures of a landscape. As a further example, an overlay resembling the shape of a vehicle or a building may be employed to assist in the taking of pictures of vehicles or buildings respectively. These examples are provided by way of illustration only.

In accordance with at least one embodiment, a microprocessor of mobile device 100a is configured to display an overlay 310 appropriate for the type of object in the image being displayed, such that the overlay 310 resembles at least a portion of the object. In at least one embodiment, the overlay 310 is a stylized or generic version of a typical object that the user is attempting to view, and is not necessarily an image of the real object. Accordingly, the overlay 310 may be regarded as a template, which is provided to the user as a guide that allows him or her to properly position mobile device 100a relative to the image 300 being viewed, and to line up the image 300 with the overlay 310. In particular, the overlay 310 provides the user with feedback so that the user can orient the camera of mobile device 100a to generate an image 300 of the object on the display 110a of a size, shape and orientation that may make the object easier to view or process by the device. Where the overlay 310 resembles the object that the user is attempting to view, it may also be referred to generally as an alignment reference.

Accordingly, in at least one example embodiment, the overlay comprises a barcode alignment reference that resembles a complete barcode, even if it is not specifically the image of a real barcode or the barcode being displayed. In variant embodiments, only a portion of a barcode may be employed as a barcode alignment reference.

In at least one other example embodiment, the overlay comprises a license plate alignment reference that resembles a complete license plate, even if it is not specifically the image of a real license plate or the license plate being displayed. In variant embodiments, only a portion of a license plate may be employed as a license plate alignment reference.

However, in variant embodiments, the overlay is not an alignment reference, and therefore, the overlay need not resemble any object within the image being displayed. For example, the overlay may comprise a menu or a dialog box.

Further details of a number of embodiments will now be provided with reference to FIGS. 10A to 11B. Each of FIGS. 10A, 10B, 10C, 10D, 11A and 11B illustrate acts of a method in accordance with at least one embodiment. For purposes of illustration, the methods will be described in the context of how it may be carried out by the mobile device 100 depicted in FIG. 1.

The microprocessor 102 may receive a command, via a user interface, from a user to enter a display mode in which the mobile device 100 displays an overlay and an image. The command from the user may be received by any user interaction, including but not limited to a user's selection of a menu item or icon displayed on display 110, the selection being made using an input device such as keyboard 116 or auxiliary input device 112 such as a track ball, for example.

In some embodiments, the display mode may be entered as a result of a user directing that a particular application be executed on the mobile device 100 (e.g. a camera application, a barcode scanning application, a license plate scanning application). In some embodiments, the user's command may result in a determination that not only should an overlay be displayed, but also of the type of overlay (e.g. barcode alignment reference, license plate alignment reference) that is to be displayed. However, an overlay, displayed in accordance with embodiments described herein, may be employed for different applications and need not be restricted to the above applications. For example, where the overlay is a menu or a dialog box, the features of one or more embodiments of the methods described herein may be applied during the execution of any application where a menu or a dialog box is to be displayed.

For purposes of illustration, embodiments of the methods will be described in the context of how it may be carried out by the mobile device 100 depicted in FIG. 1 when the camera unit 148 of the mobile device 100 operates in a camera mode. When the camera mode is initiated, the camera unit 148 is configured to capture images, but it may not necessarily be expecting to display a particular type of object.

In at least one embodiment, camera unit 148 may be configured to detect that an image does in fact comprise a particular object, such as a barcode or a license plate, for example. In response to the detection of a particular object, the microprocessor 102 may automatically display an associated overlay. The microprocessor 102 may select the displayed overlay from a plurality of pre-stored overlays, stored for example in memory (e.g. flash memory 108 of FIG. 1) or other storage device.

Figure 10A:
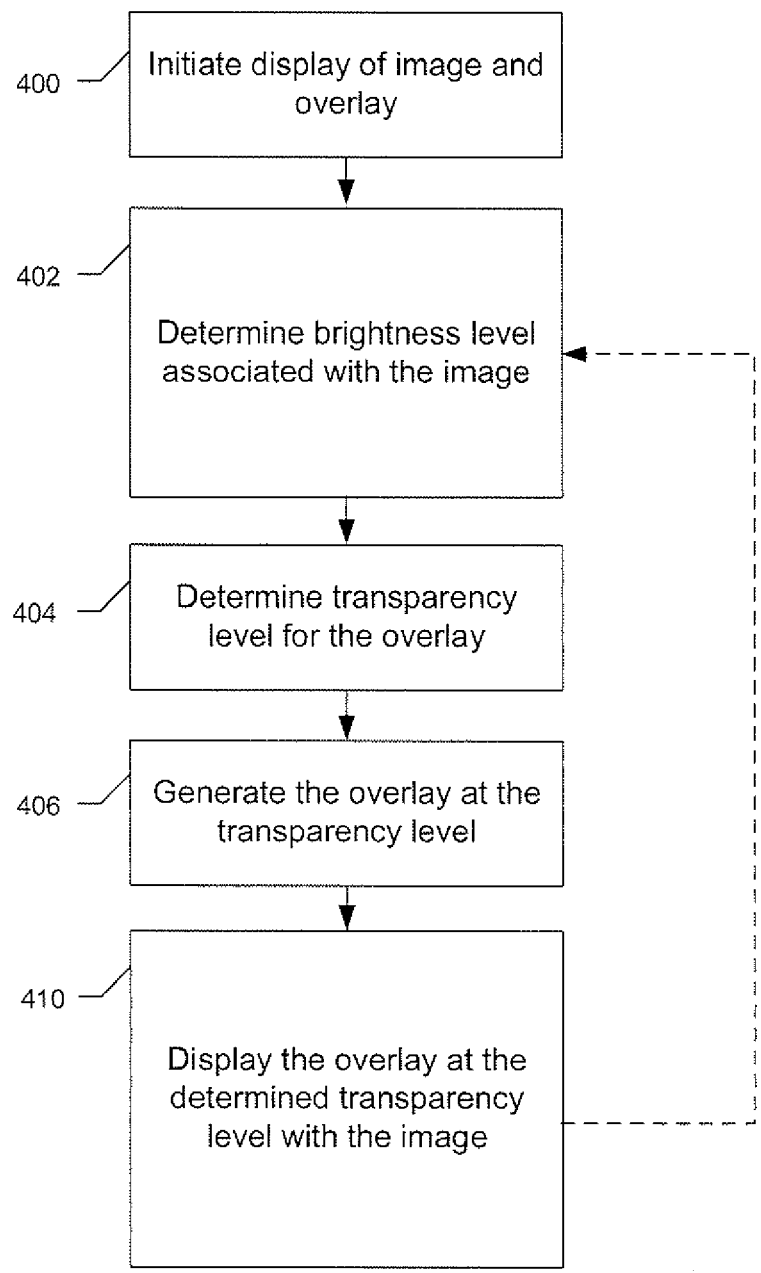

Referring to FIG. 10A, at 400, the microprocessor 102 identifies an image to be displayed based on what the camera unit 148 "sees". Microprocessor 102 initiates acts to display an overlay and the image on display 110.

At 402, the microprocessor 102 determines a brightness level associated with the image, also referred to herein as a representative brightness level. In at least one embodiment, the microprocessor 102 determines the brightness level as an average brightness level associated with the image. In at least one embodiment, the average brightness level is determined by averaging the tonal values of the image histogram and performing a comparison against a brightness scale from fully dark (i.e. an entirely black image) to fully light (i.e. an entirely white, or "washed out" image).

In another embodiment, the brightness level may be determined by considering the tonal values of the image histogram associated with a subsection of the image that is partially obscured by the overlay. This embodiment may provide a more appropriate brightness level in certain situations where the overlay is on top of a section of the image that has unique color/brightness characteristics in comparison to the rest of the image (e.g. the screen of another mobile device in a dimly light room will appear in great contrast to the rest of the device and the surrounding area).

Next, at 404, the microprocessor 102 determines a transparency level for the overlay as a function of the brightness level associated with the image. At 406, the microprocessor 102 generates the overlay at the determined transparency level for the overlay, and at 410, the microprocessor 102 controls the display 110 to display the overlay at the determined transparency level for the overlay, substantially simultaneously with the image.

In at least one embodiment, the microprocessor 102 is configured to repeat acts 402 to 410 when the image displayed in display 110 is changed (act of detecting changed image not explicitly shown). This can be done automatically when the image changes, without user intervention, so that the transparency level of the overlay changes dynamically in response. For example, when the user moves the mobile device 100 to a different location that causes the brightness of the image shown in display 110 to change, the transparency level of the overlay can change dynamically in response to the change in brightness of the image. It has been discovered by experimentation that features of the embodiments described herein may enhance usability, particularly for mobile device applications, as mobile devices are typically highly portable, and lighting conditions may change depending on the environment through which a user is moving when using his or her mobile device.

With respect to act 404, FIG. 10B illustrates an example technique for determining a transparency level for the overlay as a function of the brightness level associated with the image, as determined at 402 of FIG. 10A, in accordance with one embodiment.

In this embodiment, at 404a, the representative brightness level associated with the image is compared to a pre-defined brightness level used as a benchmark. The benchmark brightness level may vary with different implementations; however, it is assumed that this benchmark value represents a proper exposure of the image that is considered neither too dark, nor too light. In at least one embodiment, the benchmark brightness level of an image may be considered as comprising 50 percent dark pixels and 50 percent light pixels.

If, as determined at 404b, the brightness level is lower than the benchmark brightness level (i.e. the display image is dark), then the transparency level for the overlay will be set to a level that is lower than a default transparency level (i.e. increased opacity) associated with the benchmark brightness level at 404c. On the other hand, if the brightness level is higher than the benchmark brightness level (i.e. the display image is lighter), then the transparency level for the overlay will be set to a level that is higher than the default transparency level (i.e. increased transparency) associated with the benchmark brightness level at 404d. It is understood that the scales and values used may vary slightly upon implementation with respect to the different hardware used for various camera units and displays; however, in general, the default transparency level for an overlay on an image with the benchmark brightness level of 50% brightness will typically be 50% transparent. As the brightness level of the image decreases and approaches 0% (i.e. a fully dark image), the opacity of the overlay approaches 100% (i.e. the transparency approaches 0%). As the brightness level of the image increases and approaches 100% (i.e. a "washed out", fully light image), the transparency of the image increases and approaches 100% (i.e. the opacity reaches 0%).

Figure 10C:
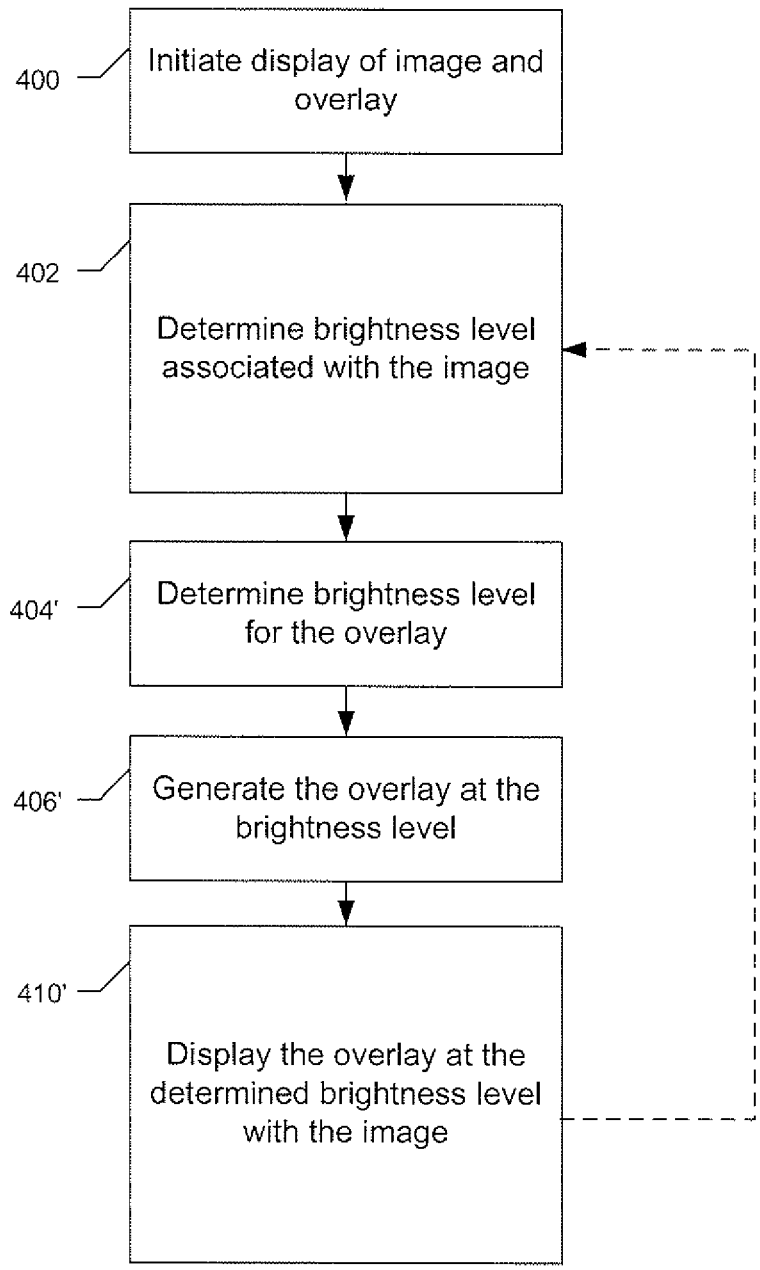
FIGS. 10C and 10D are flowcharts illustrating methods of displaying an overlay in a device display screen, in accordance with at least one other embodiment.

At least one other embodiment is described with reference to FIGS. 10C to 10D. The method depicted in FIG. 10C is similar to the method depicted in FIG. 10A, in that a representative brightness level associated with the image is determined. However, in a variant embodiment, the "brightness" of the overlay, rather than the transparency level of the overlay, is set as a function of the representative brightness level associated with the image, In one embodiment, selecting an overlay that is brighter than an overlay of a default "brightness" level may comprise selecting a brighter shade of the same color as the overlay of the default "brightness" level from a color palette. For example, if the overlay of the default "brightness" level is a certain shade of blue, a "brighter" overlay may be obtained by changing its color to a lighter shade of blue that would appear "brighter" to a user. Similarly, selecting an overlay that is less bright than an overlay of a default "brightness" level may comprise selecting a less bright shade of the same color as the overlay of the default "brightness" level from a color palette. For example, if the overlay of the default "brightness" level is a certain shade of blue, a "less bright" overlay may be obtained by changing its color to a darker shade of blue that would appear "less bright" to a user.

Referring now to FIG. 10C, acts 400 and 402 of FIG. 10C are analogous to acts 400 and 402 of FIG. 10A. At 404', the microprocessor 102 determines a brightness level for the overlay as a function of the brightness level associated with the image. At 406', the microprocessor 102 generates the overlay at the determined brightness level for the overlay, and at 410', the microprocessor 102 controls the display 110 to display the overlay at the determined brightness level for the overlay, substantially simultaneously with the image.

In at least one embodiment, the microprocessor 102 is configured to repeat acts 402 to 410' when the image displayed in display 110 is changed (act of detecting changed image not explicitly shown). This can be done automatically when the image changes, without user intervention, so that the transparency level of the overlay changes dynamically in response. For example, when the user moves the mobile device 100 to a different location that causes the brightness of the image shown in display 110 to change, the brightness level of the overlay can change dynamically in response to the change in brightness of the image. It has been discovered by experimentation that features of the embodiments described herein may enhance usability, particularly for mobile device applications, as mobile devices are typically highly portable, and lighting conditions may change depending on the environment through which a user is moving when using his or her mobile device.

Figure 10D:
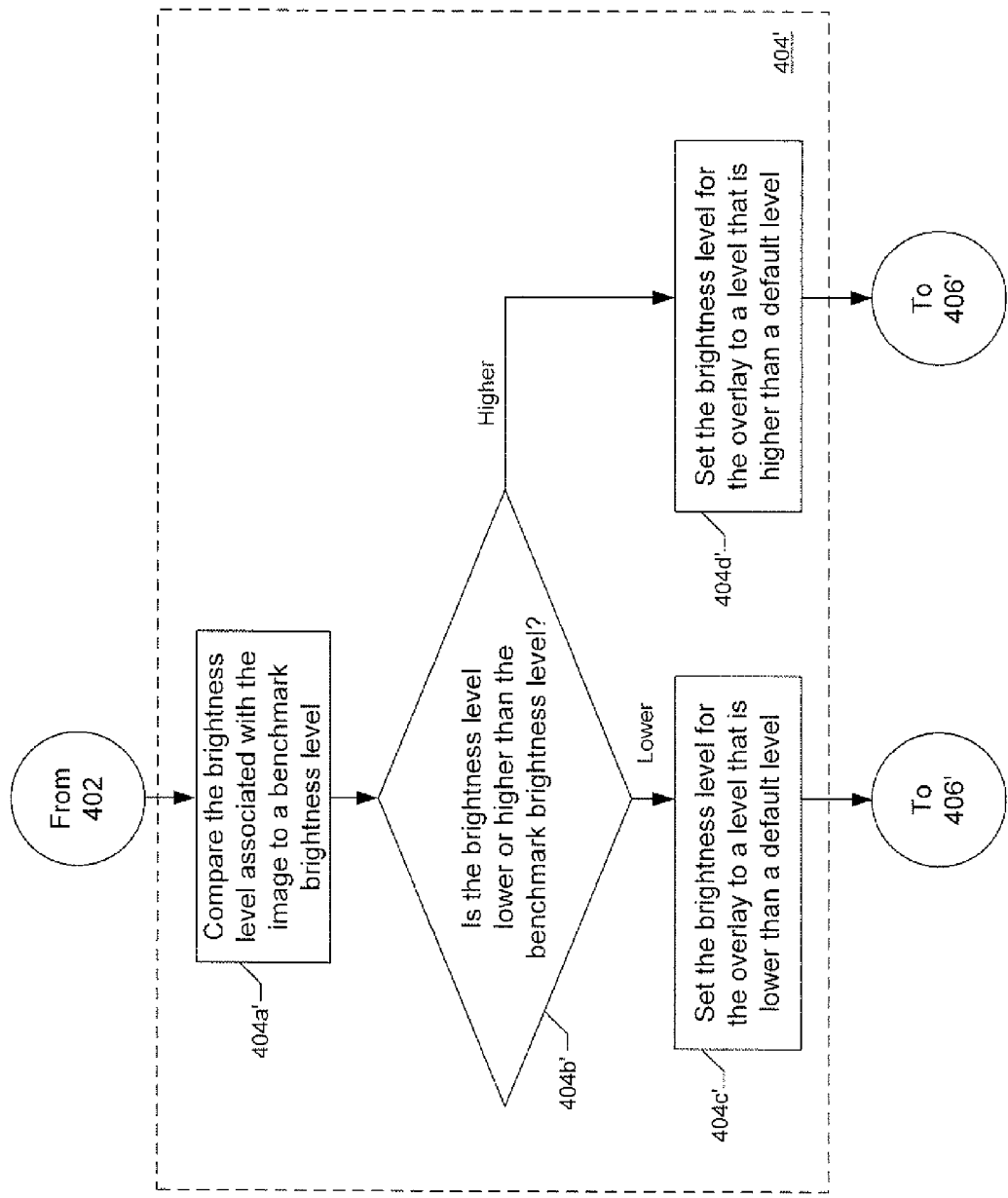

With respect to act 404', FIG. 10D illustrates an example technique for determining a brightness level for the overlay as a function of the brightness level associated with the image, as determined at 402 of FIG. 10C, in accordance with one embodiment.

In this embodiment, at 404a', the representative brightness level associated with the image is compared to a pre-defined brightness level used as a benchmark. The benchmark brightness level may vary with different implementations; however, it is assumed that this benchmark value represents a proper exposure of the image that is considered neither too dark, nor too light. In at least one embodiment, the benchmark brightness level of an image may be considered as comprising 50 percent dark pixels and 50 percent light pixels.

If, as determined at 404b', the brightness level associated with the image is lower than the benchmark brightness level (i.e. the display image is dark), then the brightness level for the overlay will be set to a level that is lower than a default brightness level for the overlay at 404c, where the default brightness level for the overlay is associated with the benchmark brightness level for the image. On the other hand, if the brightness level associated with the image is higher than the benchmark brightness level (i.e. the display image is lighter), then the brightness level for the overlay will be set to a level that is higher than the default brightness level for the overlay at 404d.

At least one other embodiment is described with reference to FIGS. 11A to 11B. Generally, the overlay may be displayed in at least one color. The microprocessor 102 may determine which color or colors the overlay should contain, based on certain aspects of the image within the field of view of the camera unit. For example, if the image is considered to be generally light in color, the overlay may be displayed in a dark color (e.g. blue, black). If the image is considered to be generally dark in color, the overlay may be displayed in a light color (e.g. yellow, white). This may make the overlay appear more prominent depending on the color of the ambient light in the vicinity of the mobile device 100, for example.

Figure 11A:
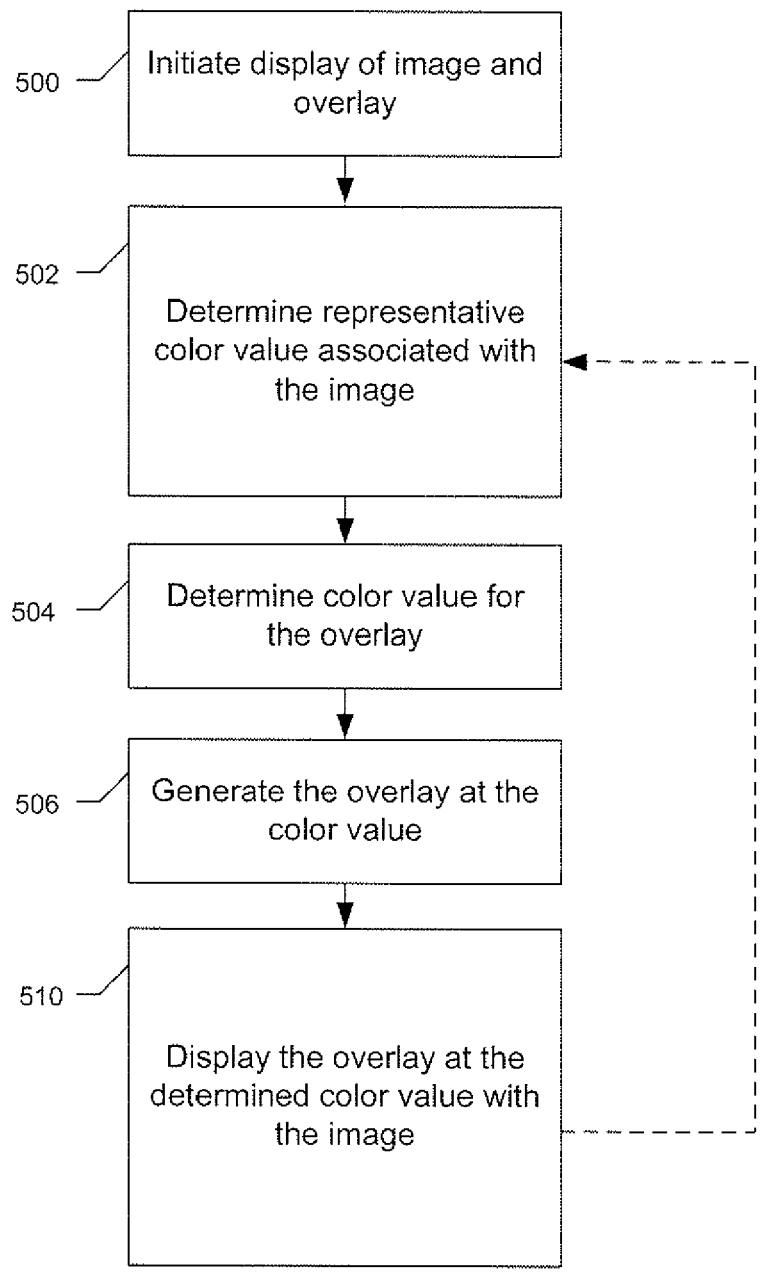

For example, referring to FIG. 11A, at 500, the microprocessor 102 identifies an image to be displayed based on what the camera unit 148 "sees". Microprocessor 102 initiates acts to display an overlay and the image on display 110.

At 502, the microprocessor 102 determines a representative color value associated with the image. In at least one embodiment, the microprocessor 102 determines the color value as an average hue associated with the image. As previously described, the representative color value of the image displayed in display 110a may be determined by evaluating the tonal qualities of the image's color histogram, and averaging the individual color values to determine the overall representative hue of the image. In a variant embodiment, the representative color value may be derived from histogram values of only the portion of the image that is partially obscured by the overlay (e.g. the edges of the image may be of a different color value if the user is trying to center an object within the overlay where the target object is against a uniform background).

Next, at 504, the microprocessor 102 determines a color value for the overlay as a function of the color value associated with the image. At 506, the microprocessor 102 generates the overlay at the color value for the overlay, and at 510, the microprocessor 102 controls the display 110 to display the overlay at the determined color value for the overlay, substantially simultaneously with the image.

In at least one embodiment, the microprocessor 102 is configured to repeat acts 502 to 510 when the image displayed in display 110 is changed (act of detecting changed image not explicitly shown). This can be done automatically when the image changes, without user intervention, so that the color of the overlay changes dynamically in response. For example, when the user moves the mobile device 100 to a different location that causes the general hue of the image shown in display 110 to change, the color of the overlay can change dynamically in response to the change in the general hue of the image. As previously noted, it has been discovered by experimentation that features of the embodiments described herein may enhance usability, particularly for mobile device applications, as mobile devices are typically highly portable, and lighting conditions may change depending on the environment through which a user is moving when using his or her mobile device.

With respect to act 504, FIG. 11B illustrates an example technique for determining a color value for the overlay as a function of the color value associated with the image, as determined at 502 of FIG. 11A, in accordance with at least one embodiment.

In one embodiment, at least one first numerical value representing a color value associated with the image is determined at 504a. For example, the average hue associated with the image, or with a section of the image obscured by the semi-transparent overlay, is determined and represented as a single numerical value or as a set of color component values (e.g. Red, Green, and Blue components "RGB"; Cyan, Magenta, Yellow, and Black components "CMYK"; or Red, Yellow, and Blue components "RYB", or some other color defining system).

Next, at 504b, the microprocessor 102 determines at least one second numerical value, wherein each second numerical value is computed as a function of a corresponding one of the at least one first numerical value. In at least one embodiment, the second numerical value is defined to be a complementary color to the first numerical value representing the hue of the image (that is, a color representing high chromatic contrast to the first color). Any algorithm used to determine a complementary color for another given color may be used at 504b. For example, in at least one embodiment using the 24-bit RGB color space, the second numerical value $RGB_2$ can be derived from the first numerical value's components with the following simple equation: $RGB_2=(255-R_1)$, $(255-G_1)$, $(255-B_1)$.

At 504c, the microprocessor 102 sets the color value for the overlay to a color associated with the at least one second numerical value determined at 504b. This may better ensure that a good contrast between the image and the overlay is achieved.

Figure 12:
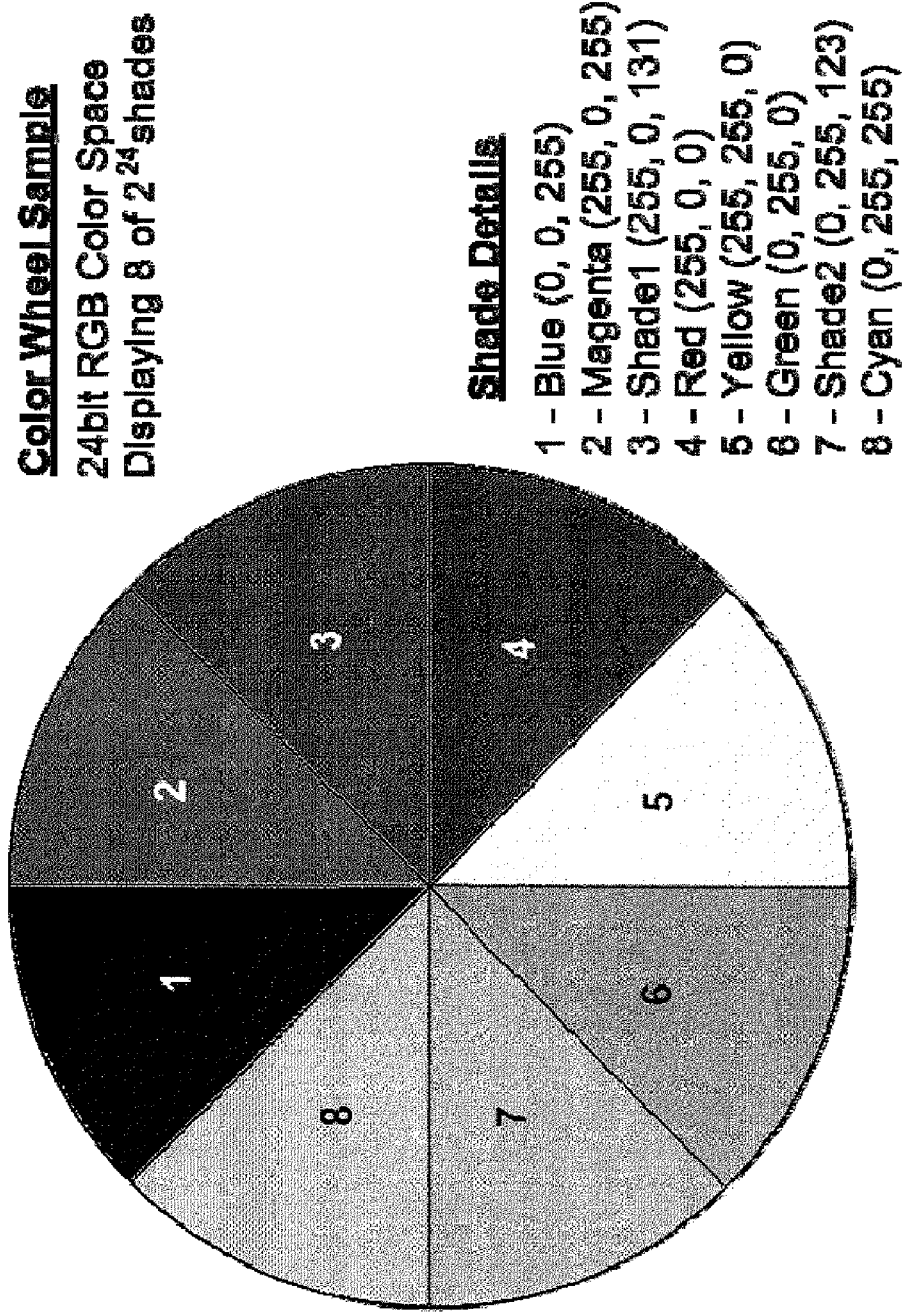
FIG. 12 illustrates an example color wheel associated with one example embodiment.

In accordance with another embodiment, the at least one first numerical value determined at 504a may identify a first location on a color wheel that represents the color value associated with the image, and the at least one second numerical value determined at 504b can be selected by identifying a second location substantially opposite to the first location on the color wheel. A color wheel is defined as a circular range of colors, with adjacent colors closely related with minor chromatic contrast. A color wheel has the unique property of being setup with complementary colors (colors with high chromatic contrast) on opposite sides of the wheel for easy visual identification. A depiction of an example color wheel associated with one example embodiment is provided in FIG. 12, by way of illustration only. Other color wheels may be employed in variant embodiments.

Internally on a mobile device, a color wheel may be represented, in one embodiment, as an integer hash table of displayable color values, where each key represents a color value and is mapped to the predetermined complementary color for the given key. In this embodiment, complementary colors do not need to be calculated on-the-fly and this implementation may greatly increase the efficiency of determining the second numerical value at 504b.

In variant embodiments, a number of features described herein with reference to one or more of the Figures may be implemented in any of a number of combinations. For example, the transparency level of an overlay generated for display may be determined as a function of a representative brightness level associated with the image being displayed, or of a representative color (e.g. general hue) associated with the image being displayed, or of both the representative brightness level and the representative color associated with the image being displayed. Similarly, the color of an overlay generated for display may be determined as a function of a representative brightness level associated with the image being displayed, or of a representative color (e.g. general hue) associated with the image being displayed, or of both the representative brightness level and the representative color associated with the image being displayed. Moreover, the brightness level of an overlay generated for display may be determined as a function of a representative brightness level associated with the image being displayed, or of a representative color (e.g. general hue) associated with the image being displayed, or of both the representative brightness level and the representative color associated with the image being displayed.

As further example, both the transparency level and the color of an overlay generated for display may be determined as a function of a representative brightness level associated with the image being displayed, or of a representative color (e.g. general hue) associated with the image being displayed, or of both the representative brightness level and the representative color associated with the image being displayed. Similarly, both the brightness level and the color of an overlay generated for display may be determined as a function of a representative brightness level associated with the image being displayed, or of a representative color (e.g. general hue) associated with the image being displayed, or of both the representative brightness level and the representative color associated with the image being displayed. Moreover, both the transparency level and the brightness level of an overlay generated for display may be determined as a function of a representative brightness level associated with the image being displayed, or of a representative color (e.g. general hue) associated with the image being displayed, or of both the representative brightness level and the representative color associated with the image being displayed.

By way of further example, the transparency level, the brightness level, and the color of an overlay generated for display may be determined as a function of a representative brightness level associated with the image being displayed, or of a representative color (e.g. general hue) associated with the image being displayed, or of both the representative brightness level and the representative color associated with the image being displayed.

Accordingly, in variant embodiments, either one, two or all three of transparency level, brightness level, and the color of the overlay can change dynamically in response to a change in the brightness of the image, in the color of the image, or in both the brightness and color of the image.

Some of the acts of the methods described herein may be provided as software instructions stored on physical computer-readable storage media (such as, for example, an optical or magnetic medium), wherein the instructions are executable by a microprocessor.

In variant implementations, some of the acts of the methods described herein may be provided as executable software instructions stored in transmission media.

A number of embodiments have been described herein. However, it will be understood by persons skilled in the art that other variants and modifications may be made without departing from the scope of the embodiments as defined in the claims appended hereto.

The invention claimed is:

1. A device comprising:
a camera unit configured to capture an image, wherein the image comprises an object;
a display configured to display an overlay and the image; and
a microprocessor configured to perform acts comprising:
detecting the object in the image,
in response to detecting the object, determining the overlay that resembles at least a portion of the object from a plurality of pre-stored overlays,
processing the image to determine at least one of a brightness level and a color value associated with the image,
determining at least one of a transparency level, a brightness level, and a color value for the overlay as a function of the at least one of the brightness level and the color value associated with the image,
generating the overlay for display at the determined at least one of the transparency level, the brightness level, and the color value for the overlay, and
controlling the display to display the overlay and the image substantially simultaneously before a user direction to save the image being displayed into memory is received.

2. The device of claim 1, wherein the object comprises a barcode, and wherein the overlay comprises a barcode alignment reference.

3. The device of claim 1, wherein the microprocessor is configured to repeat said acts when the image changes to a new image, without user intervention.

4. The device of claim 1, wherein the device comprises a mobile device.

5. The device of claim 1, wherein the brightness level associated with the image is an average brightness level associated with the image.

6. The device of claim 1, wherein determining the transparency level for the overlay comprises:
comparing the brightness level associated with the image to a benchmark brightness level;
if the brightness level associated with the image is lower than the benchmark brightness level, then setting the transparency level for the overlay to a level that is lower than a default transparency level; and
if the brightness level associated with the image is higher than the benchmark brightness level, then setting the transparency level for the overlay to a level that is higher than the default transparency level.

7. The device of claim 1, wherein determining the brightness level for the overlay comprises:
comparing the brightness level associated with the image to a benchmark brightness level;
if the brightness level associated with the image is lower than the benchmark brightness level, then setting the brightness level for the overlay to a level that is lower than a default brightness level; and
if the brightness level associated with the image is higher than the benchmark brightness level, then setting the brightness level for the overlay to a level that is higher than the default brightness level.

8. The device of claim 1, wherein the color value associated with the image is an average hue associated with at least a part of the image.

9. The device of claim 1, wherein determining the color value for the overlay comprises:

determining at least one first numerical value, wherein the at least one first numerical value identifies a first location on a color wheel that represents the color value associated with the image;

determining at least one second numerical value, such that the at least one second numerical value identifies a second location substantially opposite to the first location on the color wheel; and setting the color value for the overlay to a color associated with the at least one second numerical value.

10. The device of claim 1, wherein determining the color value for the overlay comprises:

determining at least one first numerical value, wherein the at least one first numerical value represents the color value associated with the image;

determining at least one second numerical value, each second numerical value being computed as a function of a corresponding one of the at least one first numerical value; and setting the color value for the overlay to a color associated with the at least one second numerical value.

11. A method of displaying an overlay and an image, the method comprising:

detecting an object in an image, in response to detecting the object, determining an overlay that resembles at least a portion of the object from a plurality of pre-stored overlays, processing the image to determine at least one of a brightness level and a color value associated with the image, determining at least one of a transparency level, a brightness level, and a color value for the overlay as a function of the at least one of the brightness level and the color value associated with the image, generating the overlay for display at the determined at least one of the transparency level, the brightness level, and the color value for the overlay, and controlling a display to display the overlay and the image substantially simultaneously before a user direction to save the image being displayed into memory is received.

12. The method of claim 11, wherein the object comprises a barcode, and wherein the overlay comprises a barcode alignment reference.

13. The method of claim 11, further comprising repeating the method when the image changes to a new image, without user intervention.

14. The method of claim 11, wherein the brightness level associated with the image is an average brightness level associated with the image.

15. The method of claim 11, wherein determining the transparency level for the overlay comprises:

comparing the brightness level associated with the image to a benchmark brightness level;

if the brightness level associated with the image is lower than the benchmark brightness level, then setting the transparency level for the overlay to a level that is lower than a default transparency level; and if the brightness level associated with the image is higher than the benchmark brightness level, then setting the transparency level for the overlay to a level that is higher than the default transparency level.

16. The method of claim 11, wherein determining the brightness level for the overlay comprises:

comparing the brightness level associated with the image to a benchmark brightness level;

if the brightness level associated with the image is lower than the benchmark brightness level, then setting the brightness level for the overlay to a level that is lower than a default brightness level; and if the brightness level associated with the image is higher than the benchmark brightness level, then setting the brightness level for the overlay to a level that is higher than the default brightness level.

17. The method of claim 11, wherein the color value associated with the image is an average hue associated with at least a part of the image.

18. The method of claim 11, wherein determining the color value for the overlay comprises:

determining at least one first numerical value, wherein the at least one first numerical value identifies a first location on a color wheel that represents the color value associated with the image;

determining at least one second numerical value, such that the at least one second numerical value identifies a second location substantially opposite to the first location on the color wheel; and setting the color value for the overlay to a color associated with the at least one second numerical value.

19. The method of claim 11, wherein determining the color value for the overlay comprises:

determining at least one first numerical value, wherein the at least one first numerical value represents the color value associated with the image;

determining at least one second numerical value, each second numerical value being computed as a function of a corresponding one of the at least one first numerical value; and setting the color value for the overlay to a color associated with the at least one second numerical value.

20. A non-transitory computer-readable storage medium on which is stored a plurality of instructions executable by a processor of a device, wherein the instructions when executed configures the processor to perform acts of:

detecting an object in an image, in response to detecting the object, determining an overlay that resembles at least a portion of the object from a plurality of pre-stored overlays, processing the image to determine at least one of a brightness level and a color value associated with the image, determining at least one of a transparency level, a brightness level, and a color value for the overlay as a function of the at least one of the brightness level and the color value associated with the image, generating the overlay for display at the determined at least one of the transparency level, the brightness level, and the color value for the overlay, and controlling a display to display the overlay and the image substantially simultaneously before a user direction to save the image being displayed into memory is received.

21. The non-transitory computer-readable storage medium of claim 20, wherein the object comprises a barcode, and wherein the overlay comprises a barcode alignment reference.

22. The non-transitory computer-readable storage medium of claim 20, wherein the instructions when executed further configures the processor to repeat the acts when the image changes to a new image, without user intervention.

23. The non-transitory computer-readable storage medium of claim 20, wherein the device comprises a mobile device.

24. The non-transitory computer-readable storage medium of claim 20, wherein the brightness level associated with the image is an average brightness level associated with the image.

25. The non-transitory computer-readable storage medium of claim 20, wherein determining the transparency level for the overlay comprises:
- comparing the brightness level associated with the image to a benchmark brightness level;
- if the brightness level associated with the image is lower than the benchmark brightness level, then setting the transparency level for the overlay to a level that is lower than a default transparency level; and
- if the brightness level associated with the image is higher than the benchmark brightness level, then setting the transparency level for the overlay to a level that is higher than the default transparency level.

26. The non-transitory computer-readable storage medium of claim 20, wherein determining the brightness level for the overlay comprises:
- comparing the brightness level associated with the image to a benchmark brightness level;
- if the brightness level associated with the image is lower than the benchmark brightness level, then setting the brightness level for the overlay to a level that is lower than a default brightness level; and
- if the brightness level associated with the image is higher than the benchmark brightness level, then setting the brightness level for the overlay to a level that is higher than the default brightness level.

27. The non-transitory computer-readable storage medium of claim 20, wherein the color value associated with the image is an average hue associated with at least a part of the image.

28. The non-transitory computer-readable storage medium of claim 20, wherein determining the color value for the overlay comprises:
- determining at least one first numerical value, wherein the at least one first numerical value identifies a first location on a color wheel that represents the color value associated with the image;
- determining at least one second numerical value, such that the at least one second numerical value identifies a second location substantially opposite to the first location on the color wheel; and
- setting the color value for the overlay to a color associated with the at least one second numerical value.

29. The non-transitory computer-readable storage medium of claim 20, wherein determining the color value for the overlay comprises:
- determining at least one first numerical value, wherein the at least one first numerical value represents the color value associated with the image;
- determining at least one second numerical value, each second numerical value being computed as a function of a corresponding one of the at least one first numerical value; and
- setting the color value for the overlay to a color associated with the at least one second numerical value.

* * * * *